US008032251B2

(12) United States Patent
Monn

(10) Patent No.: US 8,032,251 B2
(45) Date of Patent: Oct. 4, 2011

(54) CONTROL PANEL FOR HOT BEVERAGE DISPENSING MACHINES

(75) Inventor: Stephan Monn, Zurich (CH)

(73) Assignee: Koninklijke Philips Electronics N.V., Eindhoven (NL)

( * ) Notice: Subject to any disclaimer, the term of this patent is extended or adjusted under 35 U.S.C. 154(b) by 561 days.

(21) Appl. No.: 11/914,572

(22) PCT Filed: Apr. 11, 2006

(86) PCT No.: PCT/CH2006/000202

§ 371 (c)(1), (2), (4) Date: Nov. 16, 2007

(87) PCT Pub. No.: WO2007/003062

PCT Pub. Date: Jan. 11, 2007

(65) Prior Publication Data

US 2008/0183330 A1 Jul. 31, 2008

(30) Foreign Application Priority Data

Jul. 1, 2005 (CH) ...................................... 1118/05

(51) Int. Cl.
*G06F 17/00* (2006.01)

(52) U.S. Cl. ......................... 700/233; 700/234; 700/239

(58) Field of Classification Search .................. 700/233, 700/234, 239

See application file for complete search history.

(56) References Cited

U.S. PATENT DOCUMENTS

| | | | | |
|---|---|---|---|---|
| 4,815,633 | A * | 3/1989 | Kondo et al. | 222/129.4 |
| 5,997,236 | A | 12/1999 | Picioccio | |
| 6,152,591 | A | 11/2000 | McCall et al. | |
| 6,182,555 | B1 * | 2/2001 | Scheer et al. | 222/129.1 |
| 6,759,072 | B1 * | 7/2004 | Gutwein et al. | 426/430 |
| 7,231,279 | B2 * | 6/2007 | Ghidotti | 700/239 |
| 7,356,381 | B2 * | 4/2008 | Crisp, III | 700/242 |
| 2003/0075600 | A1 | 4/2003 | Struthers et al. | |
| 2004/0177762 | A1 | 9/2004 | Gutwein et al. | |

FOREIGN PATENT DOCUMENTS

| | | |
|---|---|---|
| EP | 0504489 | 9/1992 |
| WO | WO9725667 | 7/1997 |
| WO | WO9858320 | 12/1998 |
| WO | WO0019284 | 4/2000 |

* cited by examiner

*Primary Examiner* — Timothy Waggoner
(74) *Attorney, Agent, or Firm* — Sherry Womack

(57) ABSTRACT

A control panel for automatic beverage machines includes a touch screen that visually represents icons saved in a memory unit as the displayed basic setting as a first selector mechanism used for choosing a desired beverage and by which a predetermined preparation process is triggered. The steps of the selected beverage preparation process may be visually represented on the touch screen. Alternatively, the touch screen is used as a second selector mechanism for choosing a desired preparation setting after a beverage is chosen by actuating the first selector mechanism. When a preparation setting is selected, the touch screen displays the icon for the selected beverage in addition to setting key icons that allow an operator to select and save a desired setting.

27 Claims, 6 Drawing Sheets

CONTROL PANEL FOR HOT BEVERAGE DISPENSING MACHINES

BACKGROUND

The invention refers to a control panel for hot beverage dispensing machines, whereby the hot beverage dispensing machine is adapted to prepare and dispense several different beverages, selectable by means of the control panel, which is designed as a touch screen on which icons corresponding to a beverage can be visually displayed.

By means of known control panels for hot beverage dispensing machine, an operator can select a beverage, which in turn is prepared by the hot beverage dispensing machine and thereafter dispensed. Thereby, the preparation is often performed according to a default or pre-selected setting. The control panel can be coupled with a display device showing the selection simultaneously as text or symbol and icon, respectively, resulting in the possibility for the operator to check his input for selecting a beverage or for an individual setting of preparing a beverage. Particularly preferred for this purpose are control panels with integrated display unit, by means of which the operation of a machine is possible by simply actuating of buttons and subsequent display of a result of the input on the screen on the display unit.

In such control panels already in practical use, often symbols, so-called icons representing the beverage, like a cup of coffee, to be prepared by a hot beverage dispensing machine are used as a display for such a time until the beverage is dispensed by the machine, to subsequently being ready for preparing a further or another beverage.

Even in the case of an individual preparation setting selected by an operator, an icon for a certain beverage can be displayed, which can be selected by an operator from a group of preset selection possibilities. Thus, for example, default settings possibilities can be provided as key icons at the edge of the screen; by touching them, an operator selects a setting whereafter an icon corresponding to the touched key icon is displayed in the center of the screen.

The publication U.S. Pat. No. 6,759,072, for example, discloses a networked beverage dispensing machine having a touch screen, on which data can be displayed that have been recalled by an operator from the network and which serves also as a control panel for the beverage dispensing machine. In this case, upon a corresponding activation, icons saved in a storage device are read and visually displayed on the touch screen. Thereby, the icons refer to selection possibilities, preparation processes and/or characteristics of mixed beverages and/or of the beverage dispensing machine and/or of the touch screen.

SUMMARY OF THE INVENTION

It is one object of the invention to provide improvements to control panels for hot beverage dispensing machines in such a way that an operation of a hot beverage dispensing machine is further simplified and more comfortable.

According to one aspect of the invention, a control panel for hot beverage dispensing machines is made available, whereby the hot beverage dispensing machine is designed for preparing and dispensing several different beverages and/or mixed beverages, which in each case are selectable by means of the control panel and are prepared and dispensed upon having been selected. The control panel is designed as a touch screen panel which visually displays, as a preset display, icons saved in a storage device and representing a first selection mechanism for selecting a desired beverage or mixed beverage, by means of which, upon its activation by touching the icon visually displayed on the touch screen panel, a predetermined preparation process is initiated. Once initiated, this process can be visually represented on the touch screen in its chronological sequence. Icons saved in a storage device and representing a second selection mechanism for selecting a setting of the mode of preparation desired by an operator, together with the selection of the beverage or mixed beverage by operating the first selection device, whereby the touch screen panel shows, upon the selection of a mode of preparation, the icon for the beverage selected by means of the first selection mechanism and additional individual settings key icons, which can be touched by an operator to select and save a desired setting.

Preferably, the icons saved in a storage device and visually displayable on the touch screen comprise the possibility to select beverages and/or mixed beverages and/or their preparation processes in chronological sequence, characteristics of beverages and/or mixed beverages and/or of the hot beverage dispensing machine and/or of the touch screen panel.

By the diversity of the possible displays of icons, a simple operation is made possible. Thus, by uniquely operating a settings key displayed on the touch screen as an icon, the preparation and dispensing of a selected beverage or mixed beverage can be initiated. By providing additional icons as settings keys, a quick manipulation of the process sequence displayed on the screen is possible. An operation is also simplified by the fact that default functions can be recalled by simply touching icons on the screen.

Particularly, in the case of a selection process represented by the icons, the icons visually represent the several different beverages on the screen and make available a first selection mechanism, by means of which the desired beverage or mixed beverage is selected by an operator by touching the corresponding icon whereafter the beverage is prepared and dispensed.

Furthermore, preferably, a second selection mechanism is provided by means of which an operator, having made its selection in the first selection mechanism, can choose between the options of a default preparation or a preparation desired by the operator. Particularly, the second selection mechanism comprises a timer control or a clock control. Thus, an operator can for example, by means of touching an icon longer or shorter, simultaneously choose between a default function sequence and a default preparation, respectively, and the possibility to select a setting of a function sequence and a preparation setting, respectively.

Preferably, the touch screen displays, upon selection of the preparation setting by means of the second selection mechanism, the icon for the beverage that has been selected by means of the first selection mechanism as well as additional settings key icons, whereby touching them by an operator selects a setting. The settings keys preferably comprise icons for different sizes of the receptacle, icons for different beverage characteristics, icons for the amount of beverage to be dispensed and/or an icon for a termination of the settings, whereafter a preparation of the beverage is performed automatically in accordance with the settings. The icons for setting the amount of beverage to be dispensed can comprise "+/−" settings keys, and the amount of beverage selected by touching these buttons is preferably displayed by a further icon. The icons for setting the amount of beverage to be dispensed also can comprise "STOPP/SPEICHERN" [STOP/SAVE] settings keys, whereby the "stop" settings key is touched upon arriving at a desired amount of beverage to be dispensed, and the desired amount of beverage to be dispensed, which can be displayed by a further icon, can be saved by touching the "Speichern" [SAVE] settings key. The icon for the beverage or mixed beverage selected by means of the first selection mechanism is provided preferably in a central location of the touch screen, and the settings key icons are provided preferably laterally thereof.

By means of the icons and keys provided for setting the preparation, an operator can easily perform individual settings for a beverage to be dispensed by the hot beverage dispensing machine and, simultaneously, check these settings easily recognizable for him.

Additionally and preferably, a reset mechanism is provided for resetting the preparation mode to a default mode.

An automatic toggling of the display to an individual visual display of the icon for the selected beverage or mixed beverage is performed upon operating the first selection mechanism by an operator. Moreover, the preparation processes displayed by the icons comprise a filling of the receptacle with a beverage including a limit for the filling and a termination of the filling. The filling of a receptacle with a beverage is visually displayed by an icon or as a numeric display which displays the changes of the amount of beverage dispensed into the receptacle. If a mixed beverage is prepared, the receptacle, once it has been filled with a beverage, is automatically filled with a second beverage, and simultaneously an automatic toggling of the display of the control panel is performed for visually displaying the filling of the receptacle with a second beverage, including a limit for the filling and a termination of the filling.

In addition to the icons for a beverage visually displayed on the touch screen, settings key icons for additional functions are displayed, which can be called up by touching them by an operator. The additional functions comprise particularly a stop function during a preparation process for an early termination of filling a receptacle with a beverage and/or an extra function, by means of which an additional filling of a receptacle with a beverage can be performed. Thereby, an operator can influence a function sequence of the hot beverage dispensing machine.

Also and preferably provided is a settings mechanism, by means of which settings for different beverages, settings for the hot beverage dispensing machine itself, settings for the touch screen panel and settings for icons and assigned sounds can be performed. Additionally and preferably, a toggling mechanism is provided for toggling between a visual display of icons and a text display.

The reset mechanism, the exit mechanism, the settings mechanism and the toggling mechanism may be provided preferably as buttons in a menu bar at the edge of the touch screen control panel. By this separated provision of additional mechanisms, an operator can quickly toggle between different settings.

Preferably, the touch screen comprises an ON/OFF button, whereby an operator can put the hot beverage dispensing machine into a stand-by mode by operating it.

The beverages displayed by the icons in a hot beverage dispensing machine preferably comprise hot water, hot milk, a large coffee, coffee, espresso, espresso macchiato, cappuccino and latte macchiato The beverages can be displayed on the touch screen panel as icons in different colors. For example, upon visually displaying the preparation of a coffee, a weak coffee and a strong coffee are distinguished by a different brown tint of the filling level of the receptacle, such that an operator can notice at once, by observing the screen, which kind of coffee is prepared.

Moreover, upon visually displaying beverages as icons on the touch screen panel, a beverage specific characteristic can be displayed by means of an additional icon. This characteristic can be a grinding gear from which coffee is taken for the preparation.

A hot beverage dispensing machine for preparing and dispensing several different beverages incorporating the control panel according to the invention can be operated in a simple manner and is, for an operator, also particularly reliable, since possible operating and setting errors are comprehensively visually displayed by the control panel designed as a touch screen panel and are, therefore, noticed immediately. Moreover, the visually displayed icons enable an operator to operate the machine without having done this before and without first studying lengthy operating manuals. The preparation and dispensing of mixed beverages can be initiated by simply touching a single icon visually displayed on the touch screen.

The above mentioned and further characteristics of the invention will become clearer to the person skilled in the art from the following detailed description and the attached drawing, which represents the characteristics of the present invention with the aid of an example.

DESCRIPTION OF THE ILLUSTRATED EMBODIMENTS

In the following, the present invention will be explained in detail, by means of a preferred embodiment with reference to the accompanying drawing.

Figure 1:
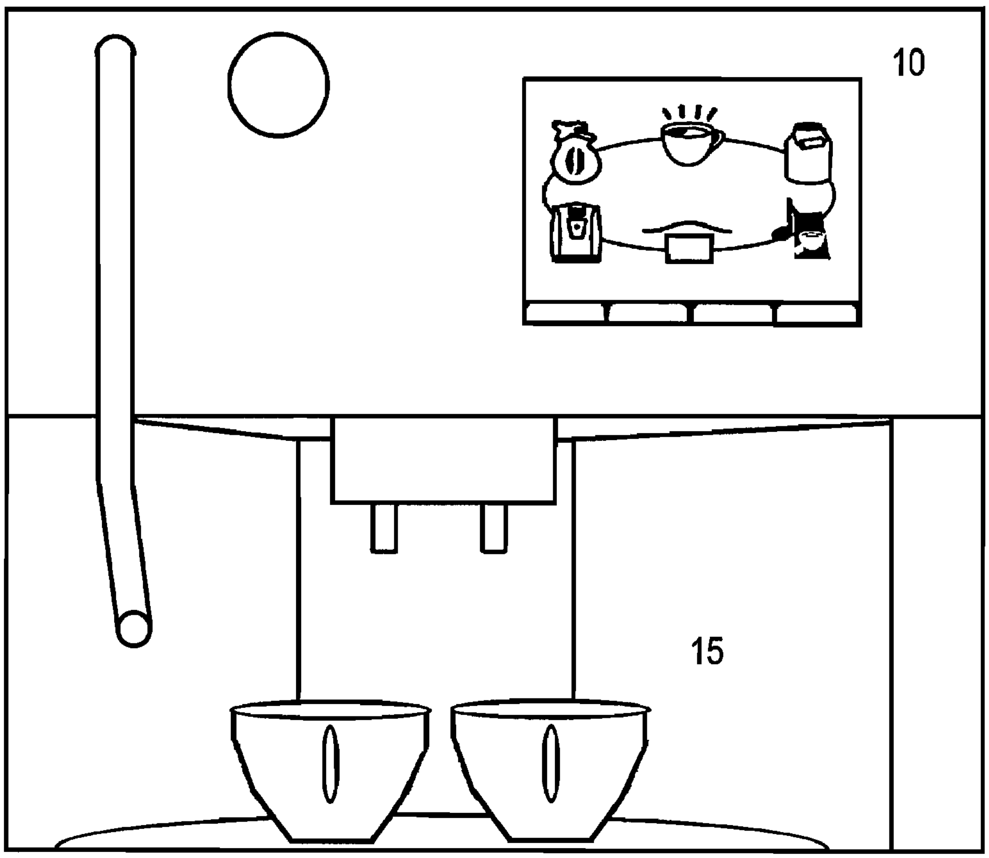
FIG. 1 shows a hot beverage dispensing machine with a control panel according to the present invention in a schematic view.

FIG. 1 shows, in a schematic view, a hot beverage dispensing machine with a control panel 10 according to one embodiment of the invention. The hot beverage dispensing machine is shown as an automatic coffee machine with two receptacles 15 to be filled.

Figure 2:
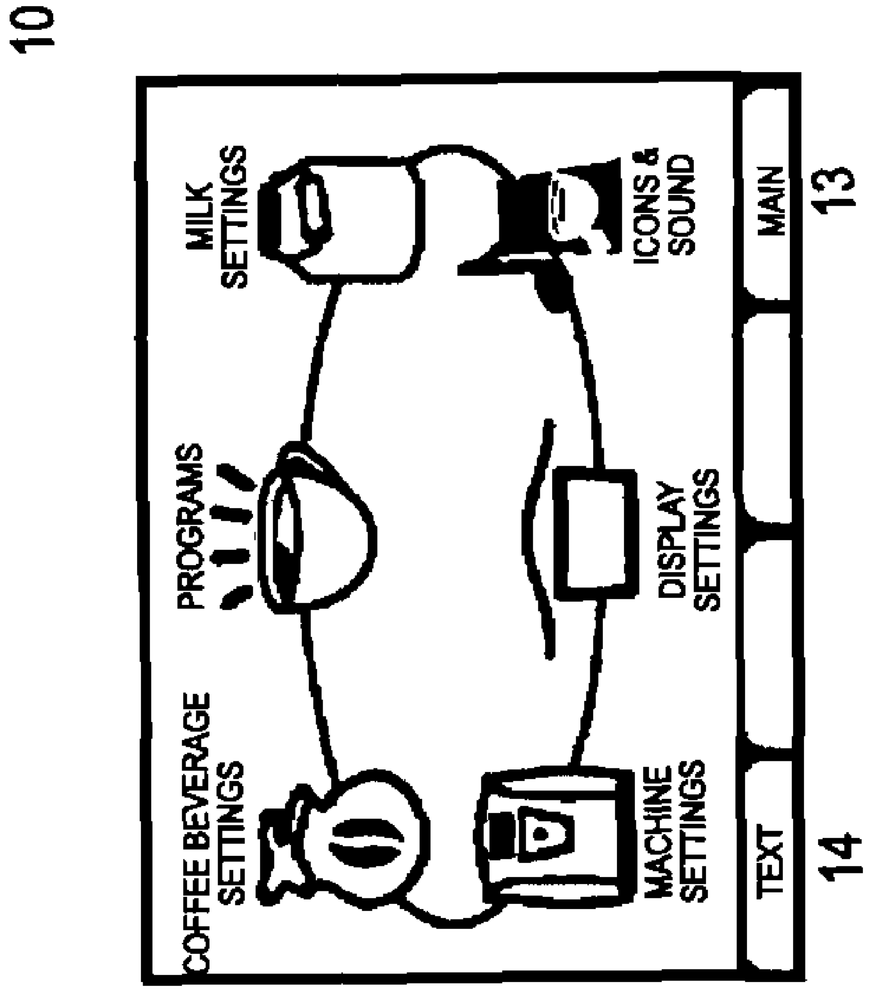
FIG. 2 shows a control panel of a hot beverage dispensing machine designed as a touch screen displaying the main menu.

FIG. 2 shows a control panel 10 of an automatic hot beverage dispensing machine, designed as a touch screen panel, whereby the basic or main display is shown. The touch screen shows different icons together with a text display located below the icons. It is possible to display icons only or text only, whereby a change between icon display and text display may be effected by means of a toggle device 14. The toggle device 14 labeled "TEXT", together with a selection device 13 labeled "MAIN", is displayed in a menu bar located at the lower edge of the touch screen display; they serve for selecting different beverages, settings of the hot beverage dispensing machine itself, settings for the touch screen display and settings for icons and associated sound, as shown in FIG. 2.

An operator can select different pre-settings for the hot beverage dispensing machine by touching one of the icons shown in FIG. 2. By touching the icon "KAFFEE EINSTELLUNGEN" [COFFEE BEVERAGE SETTINGS], he can get to a settings program in which he can set the water temperature, the water quality, the pre-grinding of coffee beans and the pre-brewing of coffee. By touching the icon "MILCH EINSTELLUNGEN" [MILK SETTINGS], he can get to a settings program in which he can select the settings relating to milk, which is more difficult to handle than water due to its perishableness, for example purification, purification time, purification cycle, an automatic stopping of an addition of milk and triggering an alarm with regard to the milk. By touching the icon. "MASCHINENEINSTELLUNGEN" [MACHINE SETTINGS], he can get to a settings program in which he can set adjustments for, for example, plate temperature, cleaning, cleaning time and cycle, descaling, timer, counter, keyboard for entering text, triggering alarm etc. By touching the icon "ANZEIGEEINSTELLUNGEN" [DISPLAY SETTINGS], he can get to a settings program in which he can set adjustments for, for example, contrast, color, language, time and date for the touch screen display. By touching the icon "ICON & KLÄNGE" [ICONS & SOUND], he can get to a settings program in which he can set adjustments for, for example, the tone sound, alarm tone sound, program tone sound, program icons or symbols, animations and input confirmation. Finally, by touching the icon "PROGRAMME" [PROGRAMS], he can get to a settings program in which he can set adjustments and selections, respectively, relating to certain beverages or coffee blends.

After an operator has run or skipped this main program of FIG. 2, shown in FIG. 2, he can get to a menu display to be further explained with reference to FIGS. 3A and 3B by operating the selector device 13. If the main program should have been skipped, the hot beverage dispensing machine uses preset values.

Figure 3B:
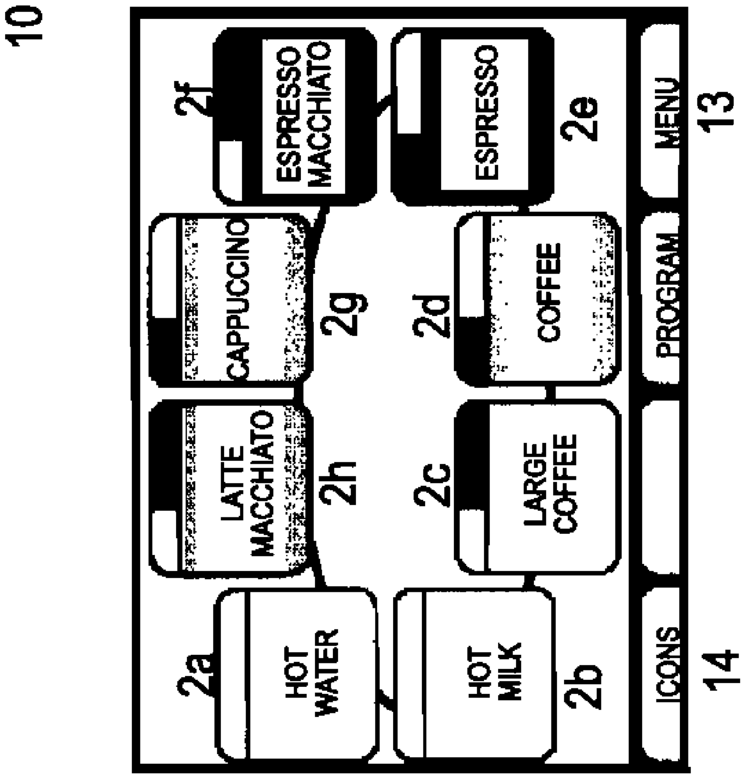
FIG. 3B depicts a control panel of a hot beverage dispensing machine designed as a touch screen displaying the program selection possibilities as text.
Figure 3A:
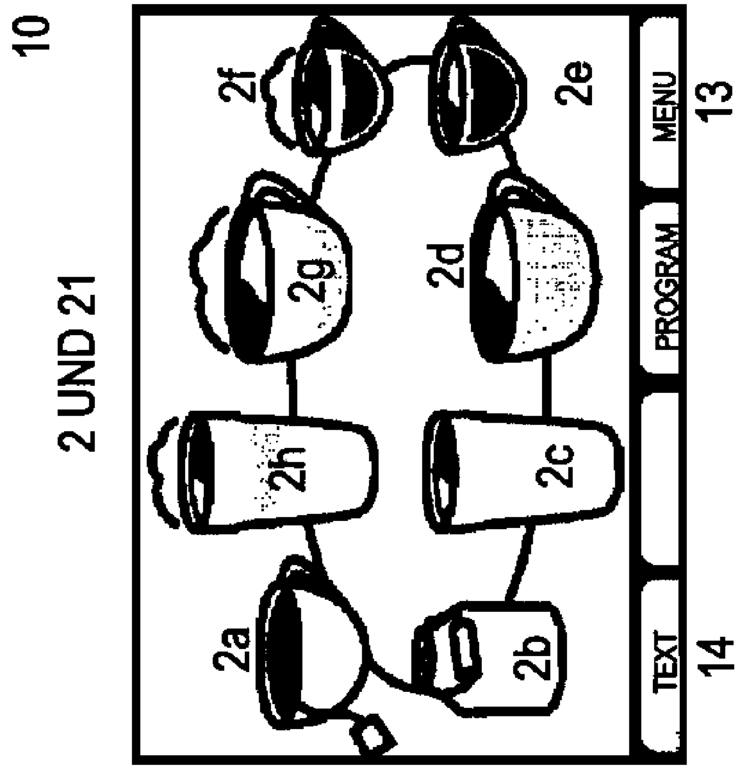
FIG. 3A depicts a control panel of a hot beverage dispensing machine designed as a touch screen displaying the program selection possibilities as icons.

FIGS. 3A and 3B show a control panel 10 of a hot beverage dispensing machine, designed as touch screen panel with program selection possibility displayed as icons or text. A toggling between icon and symbol display, respectively, of FIG. 3A and a text display of FIG. 3B can be done by means of the toggle device 14 already described with reference to FIG. 2 and labeled here with "TEXT" and "ICONS", respectively.

Both FIGS. 3A and 3B show a plurality of beverages to be selected, which can be prepared by the hot beverage dispensing machine. Particularly, shown here are eight beverages: Hot water, hot milk, large coffee, coffee, espresso, espresso macchiato, cappuccino and latte macchiato. A black or white color icon shown in a cup or in a bar above a text indicates, as an additional symbol, the side of a grinding gear of the hot beverage dispensing machine selected for a coffee to be prepared. The grinding gear can be selected by simply touching the additional symbol.

An operator can also select a beverage to be prepared by the hot beverage dispensing machine by touching one of the icons of FIG. 3A or the corresponding text of FIG. 3B on the touch screen panel. After a beverage has been selected by the operator, the hot beverage dispensing machine begins to prepare the selected beverage according to a preset program and to dispense it. Simultaneously, the hot beverage dispensing machine switches the touch screen panel automatically to a new visual representation. This new visual representation is explained in more detail in the following, with reference to FIGS. 4A, 4B and 4C.

Figure 4C:
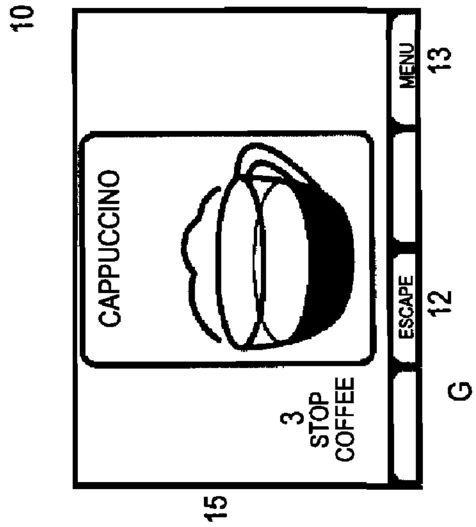
FIG. 4C shows a control panel of a hot beverage dispensing machine designed as a touch screen displaying the selected program after the preparation of a beverage and completed filling of a receptacle with a beverage.
Figure 4B:
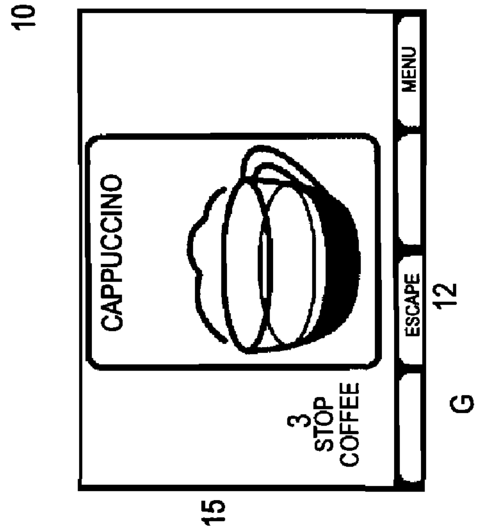
FIG. 4B discloses a control panel of a hot beverage dispensing machine designed as a touch screen displaying the selected program during the preparation of a beverage and filling of a receptacle with a beverage.
Figure 4A:
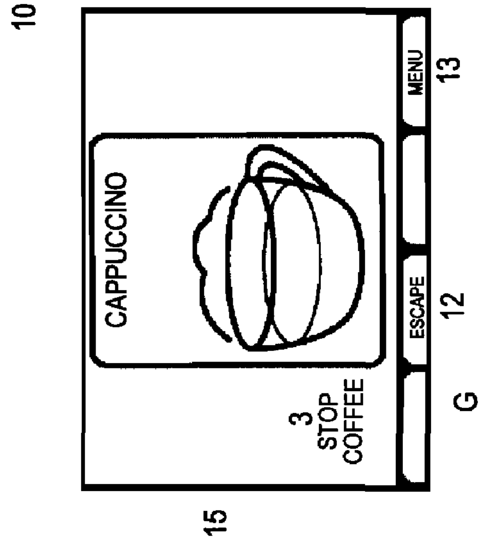
FIG. 4A illustrates a control panel of a hot beverage dispensing machine designed as a touch screen displaying the selected program directly after the selection of a program, and before the preparation of a beverage and filling of a receptacle with a beverage.

FIGS. 4A, 4B and 4C, in each case, show a control panel 10 of a hot beverage dispensing machine as a touch screen panel with a displayed, selected program. Thereby, the representations of FIGS. 4A, 4B and 4C correspond, in each case, to the moment immediately after selecting a program and before preparing a beverage and filling a receptacle 15 with the beverage, a process of preparing of a beverage and filling a receptacle 15 with the beverage, and the moment after preparation of a beverage and a complete filling of a receptacle 15 with the beverage. Thus, FIGS. 4A, 4B and 4C show different representations during filling a receptacle 15 with a beverage. Filling shall continue until a preset limit is reached, which is labeled in FIGS. 4A to 4C with G. It can be recognized in FIG. 4C that the limit G for filling a beverage into the receptacle 15 is reached, such that no further filling will take place. In this way, the operation of filling a receptacle 15, in this case a cappuccino cup, is visualized to an operator, such that he does not need to observe the actual filling-in of a beverage into a receptacle.

Moreover, in FIGS. 4A, 4B and 4C, it can be seen that the icon of the selected beverage, in the present case cappuccino, is centrally displayed on the screen in larger scale, corresponding to the icon touched by the operator before in FIG. 3A or 3B for the sake of beverage selection; the representation of the enlarged icon is changed to visualize the process performed by the hot beverage dispensing machine, i.e., the filling of the cappuccino cup.

A further icon "STOPP KAFFEE" [STOP COFFEE] is located at the (here) left side of the screen besides the central enlarged icon for a cappuccino cup and serves as a settings key icon 3. By touching this icon, an operator can stop the dispensing of the beverage, the coffee, into the receptacle 15, the cup, at will, even before the displayed limit G for filling a beverage into the receptacle 15 is reached.

If the beverage is not a mixed beverage, the hot beverage dispensing machine has fulfilled its function, as soon as the receptacle 15 is filled up to the limit G, and the receptacle 15, together with the beverage contained therein, can be removed from the dispensing machine.

However, if the selected beverage is a mixed beverage, as for example the cappuccino described as an example, a further beverage, as milk for cappuccino, has to be prepared and filled into the receptacle 15, the cup. Thereby, it is automatically switched to the process of the hot beverage dispensing machine for this further beverage according to the selection of the beverage with regard to FIGS. 3A and 3B.

Simultaneously and in accordance with the invention, an automatic switching of the screen display for the process for the further beverage is performed, as will be explained in more detail with reference to FIGS. 5A, 5B, 5C and 5D.

Figure 5C:
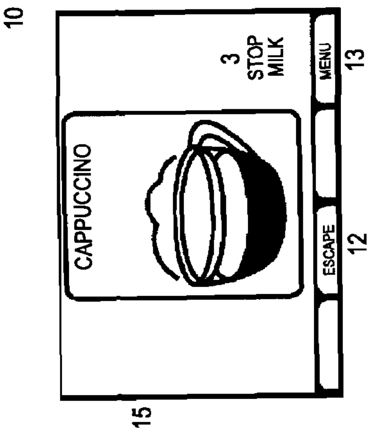
FIG. 5C depicts a control panel of a hot beverage dispensing machine designed as a touch screen displaying the selected program after the preparation of a second beverage and having filled a receptacle, filled with a first beverage, with the second beverage.
Figure 5B:
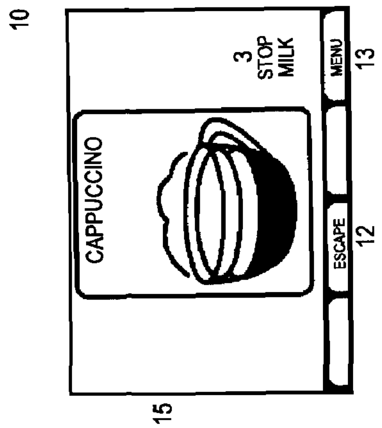
FIG. 5B illustrates a control panel of a hot beverage dispensing machine designed as a touch screen displaying the selected program during the preparation of a second beverage and filling a receptacle, filled with a first beverage, with the second beverage.
Figure 5D:
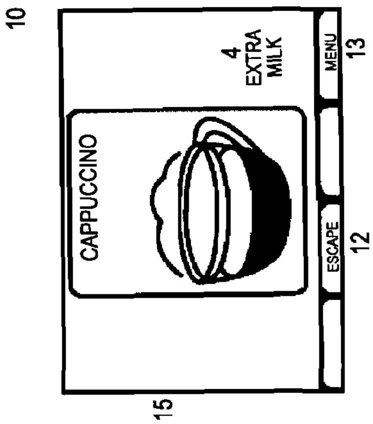
FIG. 5D is a control panel of a hot beverage dispensing machine designed as a touch screen displaying the selected program after the preparation of a second beverage and having filled a receptacle, filled with a first beverage, with the second beverage, with the possibility to add an additional amount of the second beverage to the receptacle.
Figure 5A:
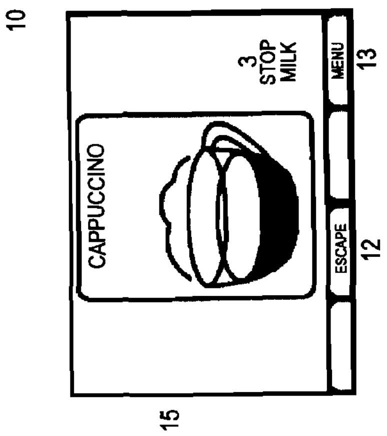
FIG. 5A shows a control panel of a hot beverage dispensing machine designed as a touch screen displaying the selected program directly after the preparation of a beverage and completed filling of a receptacle with a beverage, and before the preparation of a second beverage and filling the receptacle, filled with a first beverage, with the second beverage.

FIGS. 5A, 5B, 5C and 5D show a control panel 10 of a hot beverage dispensing machine, designed as touch screen panel, displaying the selected program directly after the preparation of a first beverage and after a complete filling of a receptacle 15 with the first beverage. Particularly, FIG. 5A shows a display before the preparation of a second beverage and the filling of a receptacle 15, filled with a first beverage, with a second beverage, FIG. 5B shows a display during the preparation of a second beverage and the filling of a receptacle 15, filled with a first beverage, with a second beverage, FIG. 5C shows a display after the preparation of a second beverage and the completed filling of a receptacle 15, filled with a first beverage, with a second beverage, and FIG. 5D shows a display after the preparation of a second beverage and the completed filling of a receptacle 15, filled with a first beverage, with a second beverage, with the possibility to select the addition of an additional amount of the second beverage into the receptacle 15.

It can be recognized that the sequence of preparing a second beverage by the hot beverage dispensing machine as shown in FIGS. 5A to 5C corresponds to the sequence as shown in FIGS. 4A to 4C, whereby, however, the icon "STOPP KAFFEE" [STOP COFFEE] located laterally (left) of the enlarged central icon representing a cappuccino cup is now located as icon "STOPP MILCH" [STOP MILK] laterally (right) of the enlarged central icon representing a cappuccino cup as an operating button icon 3. A limit for filling with the second beverage is not specifically indicated here and the second beverage is filled into the receptacle 15 up to a preset amount. In FIG. 5D, in which the centrally located icon, corresponding to FIG. 5C, represents a display after the preparation of a second beverage and a completed filling of a receptacle 15, filled with a first beverage, with the second beverage, the icon "STOPP MILCH" [STOP MILK] of FIG. 5C is replaced by the icon "EXTRA MILCH" [EXTRA MILK] as an operating icon 4. While an interruption of the supply of milk to the receptacle 15 can be realized by touching the icon "STOPP MILCH" [STOP MILK], touching the icon "EXTRA MILCH" [EXTRA MILK] effects that the hot beverage dispensing machine fills additional milk into the receptacle.

After having filled the receptacle 15 with a (mix) beverage, the hot beverage dispensing machine has fulfilled its function selected by an operator, and the receptacle 15 can be removed from the machine, together with the (mix) beverage contained therein.

After the operation sequence and the assigned display sequence on the touch screen of the control panel according to the invention has been described, in the following and with reference to FIGS. 6A to 6C, it is described how an operator can make individual adjustments for certain beverages in a simple manner.

Figure 6C:
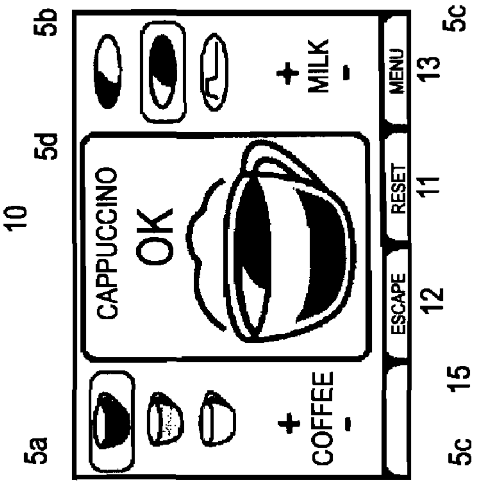
FIGS. 6A, B and C show a control panel of a hot beverage dispensing machine designed as a touch screen displaying the possibility of selecting the preparation.
Figure 6B:
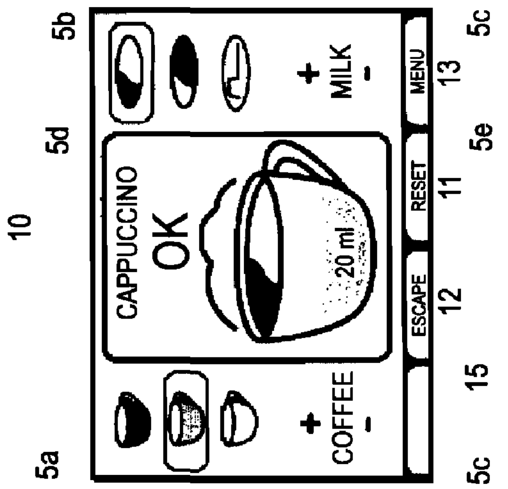
Figure 6A:
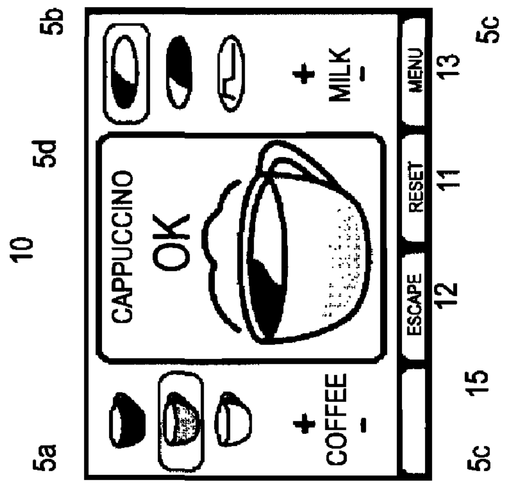

An operator arrives at the icons shown in FIGS. 6A to 6C simultaneously with the selection of a certain beverage by touching one of the icons on the screen of FIG. 3A or the corresponding text of FIG. 3B by a second selection mechanism 21. The second selection mechanism 21 differs from the first selection mechanism 2 particularly by a timer control; that means, an operator has to touch an icon for an extended time. It can be provided also by a clock control; that means, an operator has to touch the icon shortly several times (twice). To avoid errors in the sequence of the hot beverage dispensing machine, however, the timer control is preferred. Incidentally, an activation of the control panel is effected preferably at the moment of releasing an icon touched for operation.

FIGS. 6A, 6B and 6C show a control panel of a hot beverage dispensing machine designed as touch screen panel with displayed preparation possibilities. The touch screen panel shown here shows upon the selection of the preparation by means of the second selector mechanism 21 the icon 2*g* for the beverage selected by means of the first selector mechanism 2, i.e., cappuccino, as well as additional settings keys 5*a*, 5*b* 5*c*, 5*d*; upon an operator touching them, an adjustment is made. The settings keys are icons 5*a* for different sizes of the receptacle 15, here the cup, icons 5*b* for different characteristics of the beverage, here strong to weak coffee, icons 5*c* for setting the amount of beverage to be filled in, here amounts of coffee and milk, and/or an icon 5*d* for a termination of the adjustments, whereafter a preparation of a beverage is performed automatically according to the settings. The icons 5*c* for adjusting the amount of beverages to be dispensed are, according to FIGS. 6A to 6C, "+/−" settings keys, and the amount of dispensed beverage set by touching these settings keys is displayed by a further icon 5*e*, 20 ml in FIG. 6B. These icons 5*c* for adjusting the amount of the beverages to be dispensed can also be "STOPP/SPEICHERN" [STOP/SAVE] settings keys, whereby the "STOP" icon is touched upon reaching the desired amount of beverage to be dispensed, and this desired amount of beverage to be dispensed, which can be displayed by the further icon 5*e*, can be saved by touching the "SPEICHERN" [SAVE] settings key. The icon 2*g* for the beverage selected by means of the first selector mechanism 2 is provided at a central location of the touch screen panel, and the settings keys 5*a*, 5*b*, 5*c*. 5*d* are located laterally thereof.

Moreover, as icons in the menu bar, a reset mechanism 11 for resetting the preparation settings to a factory set preparation, and an exit mechanism 12 for leaving the preparation settings are provided. The exit mechanism, by the way, is provided also in the menu bars of FIGS. 4A to 4C and FIGS. 5A to 5D and serves there similarly for terminating the particular process performed by the hot beverage dispensing machine and for bringing back the visual display of the touch screen to the basic settings display.

If an operator has performed an individual setting, the process performed by the hot beverage dispensing machine follows the representation in FIGS. 4A to 4C and/or 5A to 5D.

In one aspect of the invention, the beverages are displayed in different colors on the touch screen display, depending on their characteristics. The icons and symbols, respectively, are saved in a storage device and are retrieved from the storage device and visually displayed on the touch screen panel upon a corresponding activation, by touching an element of the control panel 10 designed as a touch screen panel or by the chronological progress of the process of preparation or of the preparation settings.

Also an "EIN/AUS" [ON/OFF] button can be displayed as an icon on the touch screen panel; such icon can perform a shut-off upon being touched by an operator. By providing a timer control, a toggling of the touch screen panel into a standby mode can be realized.

In another feature of the invention, the hot beverage dispensing machine can be operated with the described control panel in a simple manner according to a pre-setting and can also be newly adjusted in a simple manner. By the movie-like representation of processes, an operator is always well informed about the functions which are just performed by the machine. He also can, if he likes or if it is necessary, interfere with the process performed by the machine and/or correct it.

By means of the control panel according to the invention and of the hot beverage dispensing machine according to the invention, an operator has the possibility to recall preset functions in a simple manner, as well as to perform himself new adjustments.

Particularly, the control panel designed as a touch screen panel comprises, according to the particular requirements, icons and input possibilities at different locations of the touch screen panel, such that a very simple operation of a hot beverage dispensing machine can be realized.

The invention claimed is:

1. A control panel for hot beverage dispensing machines designed for preparing and dispensing a plurality of different beverages, the beverages are selectable by means of the control panel and are prepared and dispensed upon having been selected, the control panel comprises:

- a touch screen panel for displaying a plurality of icons and identifying a touched icon of the plurality of icons, the plurality of icons include a first set of icons of which, each icon represents one of the plurality of beverages and a second set of icons of which, each icon represents one of a plurality of desired preferences of beverage preparation;
  - a first selection mechanism for, in accordance with a touched icon of the first set, selecting a desired beverage, initiating a predetermined beverage preparation process, and visually representing the beverage preparation process on the touch screen panel in its chronological sequence;
  - a second selection mechanism for, in accordance with a touched icon of the second set, selecting a setting of a mode of preparation of the selected beverage in accordance with a touched icon of the second set, the touched icon of the second set of icons changes the predetermined beverage preparation process; and
  - a third selection mechanism for, in accordance with a touched icon of individual settings key icons, selecting and saving a desired combination of the touched icons of the first and second sets.

2. The control panel according to claim 1, wherein the control panel further comprises a fourth mechanism that displays at least one icon of a fourth set of the plurality of icons indicating characteristics of beverages, and/or the hot beverage dispensing machine, and/or the touch screen panel.

3. The control panel according to claim 1, wherein the control panel visually displays on the touch screen panel, at least one of a basic preset display upon switching on the hot beverage dispensing machine, a chronological progress of a preparation process, and a preparation setting.

4. The control panel according to claim 1 wherein, the second selection mechanism initiates one of a preset preparation and a preparation mode setting corresponding to selected desired preferences.

5. The control panel according to claim 4, wherein the second selection mechanism comprises, with reference to the first selection mechanism, a timer control or a clock control.

6. The control panel according to claim 1, wherein the settings key icons include icons for different sizes of a receptacle, icons for different beverage characteristics, icons for an amount of beverage to be dispensed, and an icon for a termination of the settings, whereafter the beverage preparation process is performed automatically in accordance with the settings.

7. The control panel according to claim 6, wherein the icons for setting the amount of beverage to be dispensed comprise "+/−" settings keys, and that the amount of beverage selected by touching these buttons is displayed by a further icon.

8. The control panel according to claim 6, wherein the icons for setting the amount of beverage to be dispensed comprise [STOP/SAVE] settings keys, the "stop" settings key is touched upon arriving at a desired amount of beverage to be dispensed, and the desired amount of beverage to be dispensed, which can be displayed by a further icon, can be saved by touching the [SAVE] settings key.

9. The control panel according to claim 1, wherein the first set of icons is provided at a central location of the touch screen panel, and the settings key icons are provided laterally thereof.

10. The control panel according to claim 1, further comprising a reset mechanism for resetting the beverage preparation process setting to a preset setting.

11. The control panel according to claim 1, wherein an automatic toggling of the display to an individual visual display of the second set of icons for the selected beverage is performed upon operating the first selection mechanism.

12. The control panel according to claim 1, wherein the beverage preparation processes displayed by the first set of icons comprise a filling of a receptacle with a beverage including a limit for the filling and a termination of the filling.

13. The control panel according to claim 12, wherein the filling of the receptacle with the beverage is visually displayed by an icon or as a numeric display which displays the changes of the amount of beverage dispensed into the receptacle.

14. The control panel according to claim 13, wherein once the receptacle is filled with a beverage, the receptacle is automatically filled with a second beverage, and that simultaneously an automatic toggling of the display of the control panel is performed for visually displaying the filling of the receptacle with the second beverage, including a limit for the filling of the second beverage and a termination of the filling of the second beverage.

15. The control panel according to claim 1, wherein the settings key icons are actuated by a touch.

16. The control panel according to claim 12, further comprising an icon to indicate a stop function during a preparation process for an early termination of filling the receptacle with the beverage and an icon to indicate an extra function, for an additional filling of the receptacle with the beverage.

17. The control panel according to claim 1, further comprising an exit mechanism for an activation of the display of the preset settings.

18. The control panel according to claim 1, further comprising a settings mechanism for setting the presets of the hot beverage dispensing machine.

19. The control panel according to claim 18, wherein the settings mechanism sets settings for different beverages for the hot beverage dispensing machine itself, for the touch screen panel, and for the icons and assigned sounds.

20. The control panel according to claim 1, further comprising a toggling mechanism for toggling between a visual display of icons and a text display.

21. The control panel according to claim 1, further comprising a reset mechanism, an exit mechanism, a settings mechanism, and a toggling mechanism each having an associated button displayed in a menu bar at an edge of the touch screen control panel.

22. The control panel according to claim 1, wherein the touch screen panel comprises an ON/OFF button, for switching the hot beverage dispensing machine into a stand-by mode.

23. The control panel according to claim 1, wherein the beverages displayed by the first set of icons comprise hot water, hot milk, large coffee, coffee, espresso, espresso macchiato, cappuccino and latte macchiato.

24. The control panel according to claim 1, wherein the icons of the first set representing the beverages can be displayed on the touch screen panel in different colors, corresponding to their characteristics.

25. The control panel according to claim 24, wherein, upon visually displaying the icons of the first set representing the beverages on the touch screen panel, a beverage specific characteristic is displayed by means of an additional icon.

26. The control panel according to claim 25, wherein the beverage specific characteristic comprises a grinding gear of the hot beverage dispensing machine, from which coffee is taken for the preparation.

27. The control panel according to claim 1, further comprising a hot beverage dispensing machine for preparing and dispensing several different beverages in accordance with operation of the control panel.

* * * * *